United States Patent
Deshpande et al.

(10) Patent No.: US 9,403,598 B2
(45) Date of Patent: Aug. 2, 2016

(54) HEATED INFLATION SYSTEM

(71) Applicant: GOODRICH CORPORATION, Charlotte, NC (US)

(72) Inventors: Jayant V. Deshpande, Chandler, AZ (US); Wilfred Ray McBurnett, III, Chandler, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 14/461,989

(22) Filed: Aug. 18, 2014

(65) Prior Publication Data
US 2015/0034169 A1 Feb. 5, 2015

Related U.S. Application Data

(63) Continuation-in-part of application No. 13/957,946, filed on Aug. 2, 2013, now Pat. No. 9,150,462.

(51) Int. Cl.
B64D 25/14 (2006.01)
F17C 1/00 (2006.01)
F17C 13/00 (2006.01)

(52) U.S. Cl.
CPC . *B64D 25/14* (2013.01); *F17C 1/00* (2013.01); *F17C 13/00* (2013.01); *Y10T 137/0396* (2015.04); *Y10T 137/3662* (2015.04)

(58) Field of Classification Search
CPC ....... B64D 25/14; Y10S 244/905; A62B 1/20
USPC ............................... 42/137.2, 905
See application file for complete search history.

(56) References Cited

U.S. PATENT DOCUMENTS

| | | | |
|---|---|---|---|
| 4,026,580 A | 5/1977 | Wulf et al. | |
| 4,978,832 A | 12/1990 | Rubin | |
| 5,088,516 A | 2/1992 | Fisher | |
| 5,197,595 A | 3/1993 | Coultas | |
| 5,257,640 A | 11/1993 | Delajoud | |
| 5,578,008 A * | 11/1996 | Hara | 604/96.01 |
| 5,655,790 A | 8/1997 | Faigle et al. | |
| 5,931,342 A | 8/1999 | Taylor | |
| 6,025,576 A | 2/2000 | Beck et al. | |
| 6,877,698 B2 | 4/2005 | Baker et al. | |
| 7,015,425 B2 | 3/2006 | Neal et al. | |
| 7,490,795 B2 | 2/2009 | Clegg et al. | |
| 2002/0140217 A1 | 10/2002 | Van Wynsberghe et al. | |
| 2004/0124208 A1* | 7/2004 | Yakasovic et al. | F17C 5/00 222/3 |
| 2004/0195457 A1 | 10/2004 | Baker et al. | |
| 2006/0085919 A1* | 4/2006 | Kramer et al. | 5/713 |
| 2007/0045473 A1 | 3/2007 | Clegg et al. | |

FOREIGN PATENT DOCUMENTS

| | | | |
|---|---|---|---|
| EP | 1 435 702 | * | 6/2004 |
| EP | 1818258 | | 8/2007 |

OTHER PUBLICATIONS

The extended European search report; Application No. 14178058; Date of Mailng: Jan. 7, 2015; pp. 1-6.

* cited by examiner

*Primary Examiner* — Stephen M Johnson
(74) *Attorney, Agent, or Firm* — Cantor Colburn LLP

(57) ABSTRACT

A system and method for inflating an inflatable device is disclosed. The system includes an inflation cylinder configured to hold a gas mixture under pressure, a heating element configured to selectively heat the gas mixture and a temperature sensor configured to measure a temperature of the gas mixture. A control module is coupled to the heating element and the temperature sensor. The the control module controls heating of the gas mixture based on the measured temperature, a mass of the gas mixture and a volume of the inflation cylinder.

13 Claims, 2 Drawing Sheets

HEATED INFLATION SYSTEM

CROSS REFERENCE TO RELATED APPLICATIONS

The present application is a continuation-in-part of U.S. application Ser. No. 13/957,946, filed Aug. 2, 2013, now U.S. Pat. No. 9,150,462.

BACKGROUND OF THE INVENTION

The subject matter disclosed herein relates to inflatable evacuation systems. More specifically, the subject disclosure relates to a system and method for controlling inflation of an inflatable evacuation system.

A conventional inflation system for an aircraft evacuation slide includes a compressed gas cylinder with a few mechanical parts to regulate and direct gas flow to an inflatable slide system. A gas generator generally initiates the inflation system and is consumed during the inflation process. Inflation systems are routinely tested before its final installation in an aircraft. Multiple inflation tests may be performed before the inflation system is considered ready for deployment, thereby consuming multiple gas generators. Due to the cost of gas generators, preparing an installation system for deployment on board an aircraft can generate significant costs. Therefore, there is a desire to inflate inflatable evacuation systems without using gas generators.

BRIEF DESCRIPTION OF THE INVENTION

According to one aspect, an inflation system for an inflatable device includes: an inflation cylinder configured to hold a gas mixture under pressure; a heating element configured to selectively heat the gas mixture; a temperature sensor configured to measure a temperature of the gas mixture; and a control module coupled to the heating element and the temperature sensor, the control module configured to control heating of the gas mixture based on the measured temperature, a mass of the gas mixture and a volume of the inflation cylinder.

According to another aspect, a method of inflating an inflatable device includes: providing an inflation cylinder that provides a gas mixture under pressure to the inflatable device; measuring a temperature of the gas mixture using a temperature sensor during heating of the gas mixture; and using a control module to control a heating of the gas mixture using the measured temperature, a volume of the cylinder and a mass of the gas mixture to inflate the inflatable device.

DETAILED DESCRIPTION OF THE INVENTION

Figure 1:
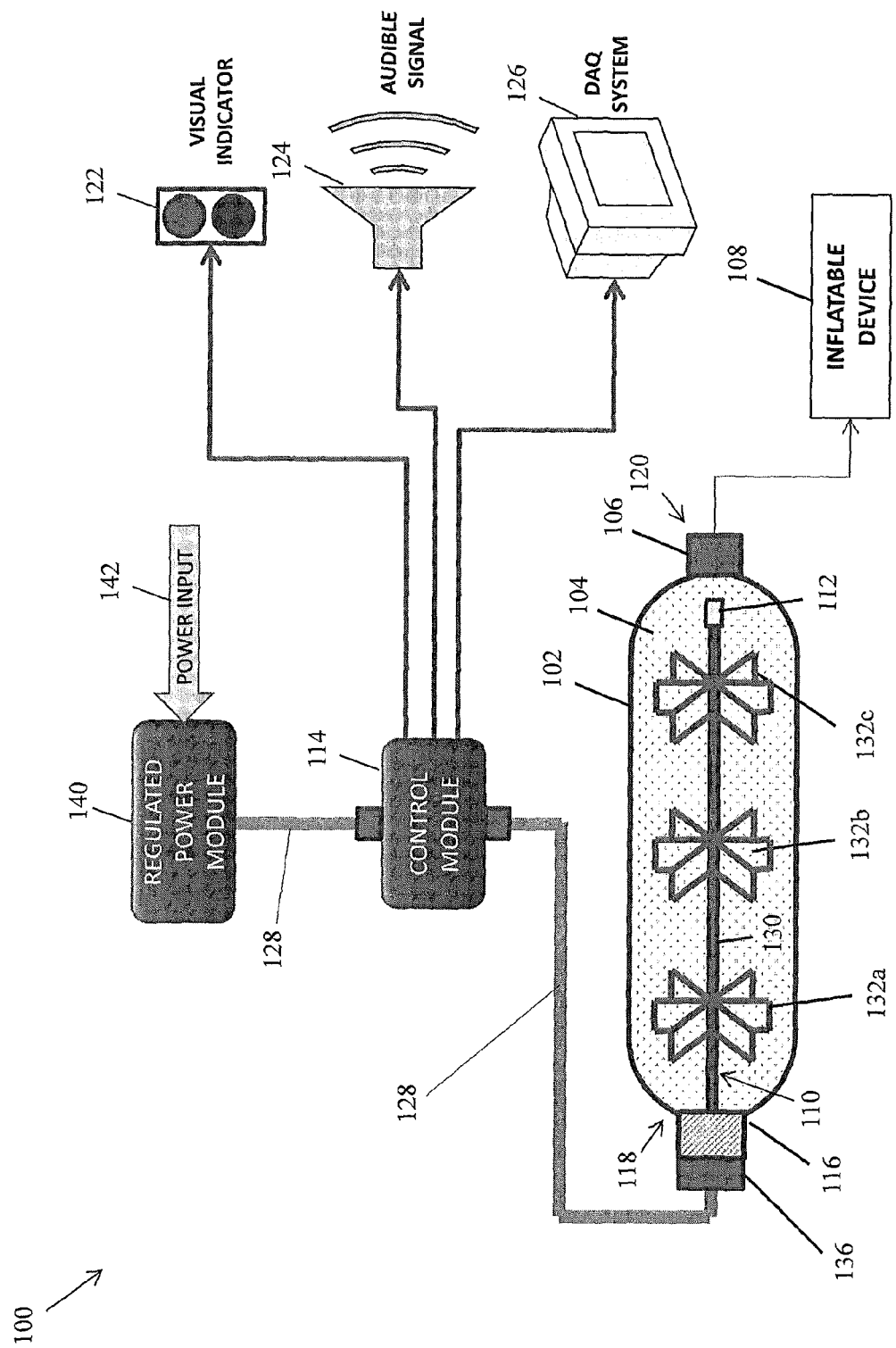
FIG. 1 shows an illustrative inflation system of the present invention according to one embodiment.

FIG. 1 shows an illustrative inflation system 100 of the present invention according to one embodiment. The inflation system 100 includes an inflation cylinder 102 configured to hold a gas mixture 104 that is under pressure. In one embodiment, the gas mixture 104 may be a combination of carbon dioxide and nitrogen gas blended at a ratio specific to requirements associated with an intended installation environment of the heated inflation system 100. In alternate embodiments, the gas mixture may be any mixture of gases suitable for use in the inflation system 100 blended at suitable ratios. The inflation cylinder 102 is sized according to requirements associated with an intended installation environment of the heated inflation system 100. The inflation cylinder 102 includes a regulator valve 106 configurable to maintain an outlet pressure of the gas mixture 104 exiting the inflation cylinder 102 to inflate an inflatable device 108. Additional components (not depicted) may be disposed between the regulator valve 106 and the inflatable device 108, such as tubing, an aspirator, and other elements known in the art. The inflatable device 108 may be, for example, a slide, raft, or slide/raft combination. The heated inflation system 100 and the inflatable device 108 may be installed in a packed slide system of an aircraft (not depicted).

A heating element 110 may be disposed within the inflation cylinder 102 to heat the gas mixture 104. A temperature sensor 112 may be disposed within the inflation cylinder 102 to sense a temperature of the gas mixture 104. In various embodiments, the temperature sensor 112 is disposed at an end of the heating element and thermally protected from the heating element via insulation (not shown). The heating element 110 may be implemented as one or more flexible heaters, such as polyimide heaters, silicone rubber heaters, heating tape, or mica heaters. Alternatively, the heating element 110 may be implemented as an insertion heater, an immersion heater, a cartridge heater, or other heater type known in the art. A control module 114 is configured to regulate heat applied by the heating element 110 to the gas mixture 104 based on a measured temperature from the temperature sensor 112, a volume of the inflation cylinder 102 and mass ratios of the gas mixture 104, as discussed below.

The heating element 110 is in direct contact with the gas mixture 104 and therefore may heat the gas mixture 104 directly using any or all of conduction, convection and radiation. In one embodiment, the heating element 110 includes a cylindrical rod 130 and fins 132a, 132b and 132c placed at axially-separated locations along the cylindrical rod 130. The fins 132a, 132b and 132c are heated along with the cylindrical rod 130 during the heating process. The fins 132a, 132b and 132c provide an increased surface area of the heating element 110 thereby increasing a rate at which heat may be transferred to the gas mixture 104. Additionally, the fins 132a, 132b and 132c extend away from the longitudinal axis of the cylindrical rod 130, thereby enabling direct heating of the gas mixture over a greater volume than would be heated using the cylindrical rod 130 alone. The heating element 110 may include aluminum, steel, other highly thermally conductive alloys, or a suitable combination thereof. Although three fins 132a, 132b and 132c are shown for illustrative purposes, any number of fins may be employed in alternate embodiments.

The heating element 110 and temperature sensor 112 may be coupled to the control module 114 through a port 116 in the inflation cylinder 102. In the embodiment of FIG. 1, the port 116 is separately located from the regulator valve 106. The regulator valve 106 may be located at a first end 118 of the inflation cylinder 102, while the port 116 is located at a second end 120 of the inflation cylinder 102 opposite the first end 118. Wiring the heating element 110 and temperature sensor 112 through the port 116 rather than through the regulator valve 106 may enable use of an existing regulator valve 106 without redesign to support internal heating of the inflation cylinder 102 and avoids obstruction of gas flow out the inflation cylinder 102 via the regulator valve 106.

In one embodiment, the heating element 110 may be connected to the inflation cylinder 102 using a quick disconnect device 136. The quick disconnect device 163 may allow insertion and removal of the heating element 110 and the inflation cylinder 102, thereby allowing replacement of components such as the heating element 110, refilling of the inflation cylinder 102 with a gas mixture 104 and reuse of the inflation system 100 over multiple inflation processes.

Control module 114 controls various aspects of the inflation system 100. The control module 114 is coupled to the heating element 110 and a regulated power module 140. A high durability harness 128 may be used to provide power between the power module 140 and the control module 114 as well as between the control module 114 and the heating element 110. The regulated power module 140 receives and conditions input power 142 to power the control module 114. The input power 142 may be provided from an aircraft power bus or a battery system (not depicted). The control module 114 may determine an amount of power to draw from the power module 140 in order to perform various functions such as heating the heating element 110. The control module 114 may increase or decrease the amount of power drawn from the power module 126 based on various calculations described herein.

The control module 114 is also in communication with a visual indicator 122, an audible indicator 124 and a data acquisition system 126. The control module 114 controls the visual indicator 122 to provide a status of the inflation system 100. For example, the visual indicator 122 may illuminate a green light when no fault is detected in the inflation system and a red light when a fault is detected in the inflation system, although any color combination may be used. The visual indicator 122 may be located in close proximity to the inflation cylinder 102 or at a remote location, such as within an aircraft cockpit and/or a flight attendant panel (FAP). Additionally, the control module 114 may control an audible indicator 124 to produce an audible signal. In one embodiment, an audible signal may indicate an occurrence of a fault. In another embodiment, the audible signal may indicate that the inflation system 100 is ready for deployment. The control module 114 may further be in communication with a data acquisition system 126. Data may be displayed and/or input at the data acquisition system 126.

Prior to operation of the inflation assembly 100, a volume of the inflation cylinder 102 and a composition of the gas mixture 104 including a mass of each component of the gas mixture 104 (e.g., mass of $CO_2$ and mass of $N_2$) are entered into the control module 114 via the data acquisition system 126.

Upon activation of the inflation assembly 100, temperature of the gas mixture is monitored using temperature measurements from the temperature sensor 102. The temperature measurements, the volume of the inflation cylinder 102 and the composition of the gas mixture 104 are used to determine an outlet pressure of the gas mixture at the regulator valve 106. The ideal gas law ($PV=nRT$) may be used to calculate outlet pressure, wherein V is the volume of the inflation cylinder 102, n is given by the input masses of the gas mixture 104, T is the measurement of temperature obtained using the temperature sensor 112 and R is the ideal gas constant. The calculated outlet pressure may further be used to determine a rate of inflation of the inflatable device 108.

The control module 114 may therefore increase a temperature of the heating element 110 or decrease of temperature of the heating element 110 based on the determined outlet pressure. In addition, the control module 114 may control the amount of power drawn from the power module 140 in order to increase or decrease the temperature of the heating element 110 to thereby maintain an outlet pressure and/or an inflation rate of the inflatable device 108 at a selected pressure value and/or inflation rate value.

The control module 114 therefore provides closed loop control of the inflation system 100, including the ability to turn on/shut down the inflation system 100, controlling an amount of power drawn from the power module 140, controlling a temperature and pressure of the gas mixture 104, and controlling various safeguards of the inflation system 100. Additionally, the control module 114 may be responsive to a reset input 124 which may be used to reinitialize the control module 114. The reset input 124 may be provided by a button, switch, or remote command from an aircraft bus (not depicted).

Figure 2A:
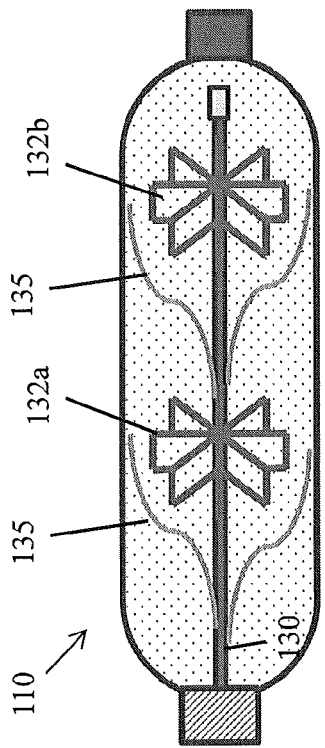
FIGS. 2A and 2B show a side view and a perspective view respectively of the heating element in one embodiment of the present invention.
Figure 3A:
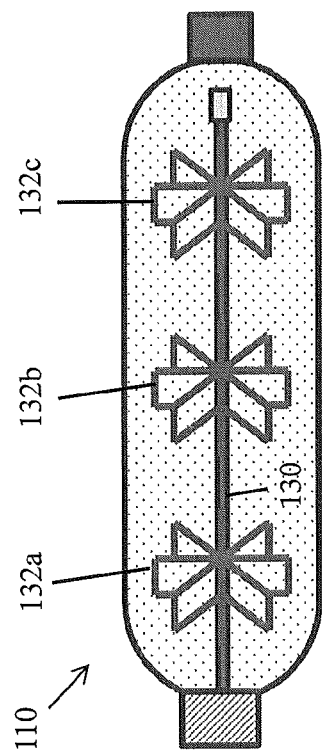
FIGS. 3A and 3B shows a side view and perspective view respectively of the heating element in another embodiment of the present invention.
Figure 2B:
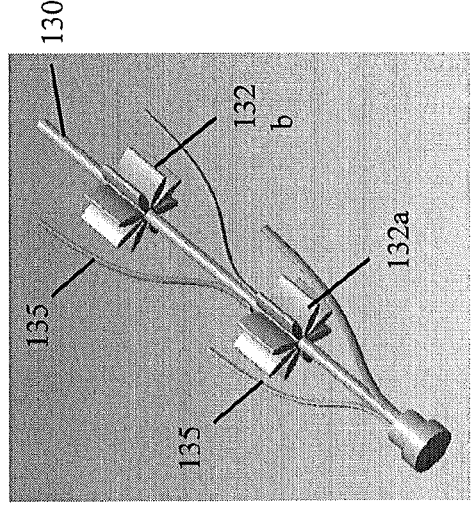
Figure 3B:
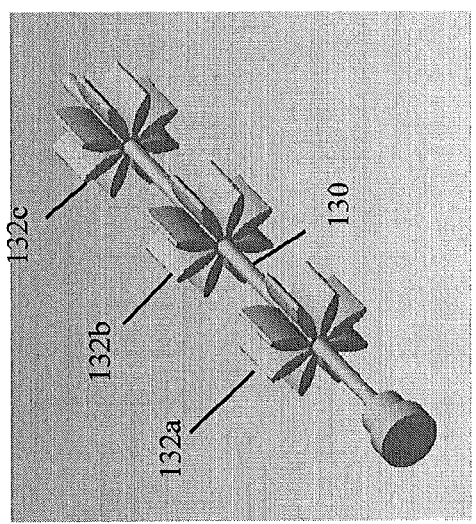

FIGS. 2A and 2B show a side view and a perspective view respectively of the heating element 110 in one embodiment of the present invention. The heating element 110 is shown including the cylindrical rod 130 and fins 132a, 132b and 132c. FIGS. 3A and 3B show a side view and perspective view respectively of the heating element 110 in another embodiment of the present invention. The heating element 110 includes the cylindrical rod 130 and fins 132a and 132b. The heating element 110 further includes wires 135 that extend outward from the cylindrical rod and along the axis of the cylindrical rod. The wires 135 provide heating to various locations within the inflation cylinder 102, thereby increasing efficiency for heat transfer into the gas mixture 104.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An inflation system for an inflatable device, comprising:
   an inflation cylinder that holds a gas mixture under pressure and releases the gas mixture through a valve to inflate the inflatable device;
   a heating element within the inflation cylinder that heats the gas mixture;
   a temperature sensor that measures a temperature of the gas mixture; and
   a control module coupled to the heating element and the temperature sensor, wherein the control module controls heating of the gas mixture based on the measured temperature, a mass of the gas mixture and a volume of the inflation cylinder to maintain a selected outlet pressure at the valve during inflation of the inflatable device.

2. The system of claim 1, wherein the selected outlet pressure is determined using the ideal gas law based on the measured temperature, the mass of the gas mixture and the volume of the inflation cylinder.

3. The inflation system of claim 1, wherein the control module further controls an amount power drawn from a power module to provide a selected temperature at the heating element.

4. The inflation system of claim 1, wherein the heating element includes a cylindrical rod having at least one feature extending away from a longitudinal axis of the rod to provide additional surface area of the heating element for heating the gas mixture.

5. The inflation system of claim 4, wherein the at least one feature includes at least one of (i) a fin; and (ii) a wire.

6. The inflation system of claim 1 wherein the control module alters an amount of heat at the heating element based on a comparison of the selected outlet pressure to a selected pressure value.

7. The inflation system of claim 1, wherein the control module is provides a signal based on a condition of the inflation system.

8. A method of inflating an inflatable device, comprising:
providing an inflation cylinder that provides a gas mixture under pressure and releases the gas mixture through a valve to the inflatable device;
heating the gas mixture using a heating element within the inflation cylinder during release of the gas mixture to the inflatable device;
measuring a temperature of the gas mixture using a temperature sensor during heating of the gas mixture; and
using a control module to control the heating of the gas mixture using the measured temperature, a volume of the cylinder and a mass of the gas mixture to maintain a selected outlet pressure at the valve during inflation of the inflatable device.

9. The method of claim 8, further comprising determining the selected outlet pressure using the ideal gas law based on the measured temperature, the mass of the gas mixture and the volume of the inflation cylinder.

10. The method of claim 8, further comprising controlling an amount power drawn from a power module to provide a selected temperature at the heating element.

11. The method of claim 8, wherein the heating element includes a cylindrical rod having at least one feature extending away from a longitudinal axis of the rod to provide additional surface area of the heating element for heating the gas mixture.

12. The method of claim 11, wherein the at least one feature includes at least one of (i) a fin; and (ii) a wire.

13. The method of claim 8, further comprising altering an amount of heat at the heating element based on a comparison of the selected outlet pressure to a selected pressure value.

* * * * *